Patented Jan. 28, 1930

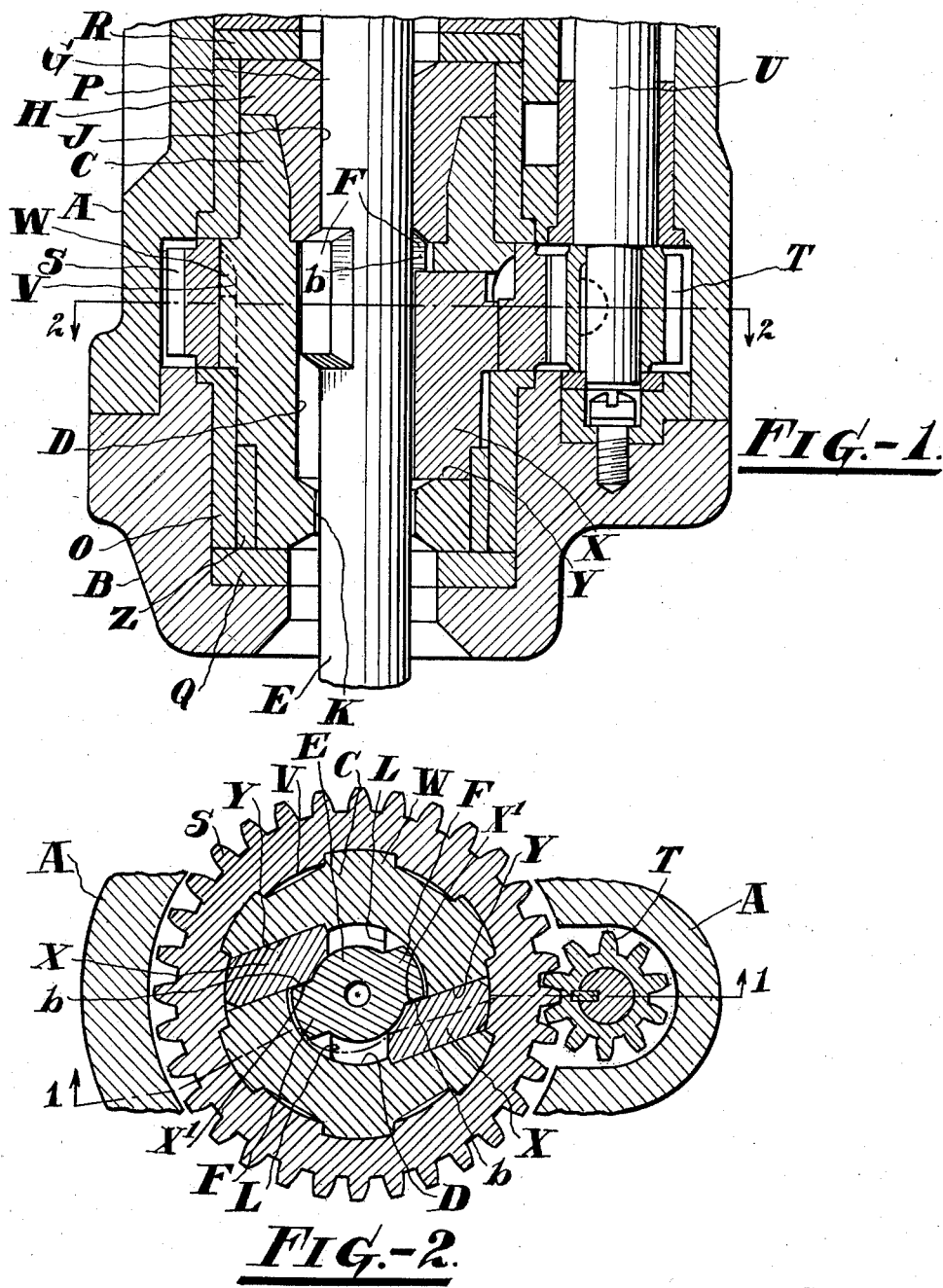

1,745,166

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

CHUCK MECHANISM FOR ROCK DRILLS

Application filed March 3, 1928. Serial No. 258,944.

This invention relates to rock drills, but more particularly to chuck mechanism for fluid actuated rock drills of the type in which the hammer piston reciprocates independently of the working implement for actuating the working implement into the work.

One object of the invention is to protect the chuck against the wearing action of the drill steel lugs or other medium whereby the drill steel is interlocked with the chuck.

Other objects will be in part obvious and in part pointed out hereinafter.

In the drawings accompanying the specification and in which similar reference characters refer to similar parts, Figure 1 is a sectional elevation of the front end of a rock drill equipped with chuck mechanism constructed in accordance with the practice of the invention, and Figure 2 is a transverse view taken through Figure 1 on the line 2—2 looking in the direction indicated by the arrows.

Referring more particularly to the drawings, A designates a front head and B a cap for the front head and which may be secured thereto in any suitable manner.

Disposed in the front head A and the cap B is a chuck C having a bore D through which extends a working implement E. The working implement illustrated is of the type commonly referred to as a Leyner steel and accordingly has a pair of lateral lugs F disposed on diametrically opposite sides of the implement. The portion G of the working implement E rearwardly of the lugs F serves as a shank against which the blows of the hammer piston (not shown) of the drill may be delivered.

A chuck bushing H is inserted in the rearward end of the chuck C and has a bore J to slidably receive the shank G of the working implement for maintaining said working implement in axial alignment with the hammer piston. The portion of the working implement E forwardly of the lugs F is guided by a bore K in the front end of the chuck and on opposite sides of the bore K are slots L of suitable proportions to permit the passage of the lugs F therethrough. Preferably bushings O and P are inserted in the cap B and the front head A respectively to provide renewable bearing surfaces for the chuck C, and plates Q and R placed at corresponding ends of the chuck mechanism serve as renewable bearing surfaces for the ends of the chuck mechanism.

The chuck mechanism shown is of the type which is adapted to be rotated for the purpose of constantly changing the position of the working implement E in the drill hole for each blow of the piston. To this end a ring gear S is disposed about the chuck C to mesh with a pinion T keyed to a shaft U which extends in a rearwardly direction and may be connected to a suitable power device, such as a gear motor (not shown). The ring gear S may be secured to the chuck C by means of longitudinal ribs V which interlock with similar ribs W on the periphery of the chuck C.

In accordance with the present invention, means are provided for preventing relative rotation between the chuck C and the drill steel E, while at the same time permitting limited endwise movement of the drill steel. These means consist of keys X inserted in transverse apertures Y in the chuck C. The keys X abut at one end with their outer surfaces the ring gear S and at their forward extremity a retaining ring Z which, like the ring gear S, encircles the chuck C and serves to prevent endwise movement of the key in an outwardly direction. The inner ends of the keys X extend into the bore D of the chuck and sides X' of the keys adjacent the lugs act as bearing surfaces for the sides b of the lugs F.

The apertures Y wherein the keys X are disposed are located on opposite sides of the chuck and are offset with respect to each other so that the lugs may lie flush against the sides X' of the keys X and thus assure substantial areas of contact between the lugs and the keys. As a result of this construction, the thrust of the lugs F against the keys X will be taken up entirely by the walls of the chuck so that the keys will be subjected to little, if any, end thrust.

Heretofore in mechanism of the type to which the present invention pertains, it has been customary to allow the lugs F of the drill steel to bear directly against the integral portions, such as ribs, of the chuck. When the chuck is thus constructed, however, the constant reciprocatory action of the drill steel lugs F soon wears the ribs to such an extent that they become weakened and unfit for their intended function and it becomes necessary in such case to discard the entire chuck. Obviously, this increases the cost of maintainance of the drill. The present invention overcomes this objectionable feature. It forms a complete protection for the chuck and whenever, due to wear, it becomes necessary to provide a new wearing surface for the drill steel lugs, the same can be supplied at a small expense by removing the worn keys and substituting other keys therefor. As a result of this construction the chuck mechanism will render service for a greatly extended period of time and longer periods of uninterrupted drilling will be obtained with drills equipped with the invention than may be with drills in which the drill steel lugs are permitted to come into direct contact with the chuck parts.

I claim:

1. In a rock drill, the combination of a front head and a working implement reciprocable in the front head, lugs on the working implement, a chuck in the front head having a bore to receive the working implement, transverse apertures in the chuck, and means in the apertures to form bearing surfaces for the lugs to prevent rotation of the working implement with respect to the chuck.

2. In a rock drill, the combination of a front head and a working implement longitudinally slidable in the front head, lugs on the working element, a chuck in the front head having a bore to receive the working implement, transverse apertures in the chuck, keys in the apertures to form bearing surfaces for the lugs to prevent rotation of the working implement with respect to the chuck, and means on the chuck for retaining the keys in said chuck.

3. In a rock drill, the combination of a front head and a working implement freely slidable in the front head, lugs on the working implement, a chuck in the front head having a bore to receive the working implement, transverse apertures in the chuck, keys inserted in the apertures to form abutments for the lugs, and means encircling the chuck for retaining the keys in the apertures.

4. In a rock drill, the combination of a front head and a working implement slidable in the front head, lugs on the working implement, a chuck in the front head having a bore to receive the working implement, transverse apertures in the chuck, keys inserted in the apertures to form abutments for the lugs, and means encircling the chuck adjacent the extremities of the keys for retaining the keys in the apertures.

5. In a rock drill, the combination of a front head and a working implement freely slidable in the front head, lugs on the working implement, a chuck in the front head having a bore to receive the working implement, transverse apertures in the chuck off-set with respect to the longitudinal axis of the chuck, keys in the apertures to engage the lugs for preventing rotation of the working implement with respect to the chuck, and means encircling the chuck adjacent the extremities of the keys for retaining the keys in the apertures.

6. In a rock drill, the combination of a front head and a working implement longitudinally slidable in the front head, lugs on the working implement, a chuck in the front head having a bore to receive the working implement, transverse apertures in the chuck off-set with respect to the longitudinal axis of the drill, keys in the apertures interlocking with the lugs for preventing relative rotation between the chuck and the working implement, and rings encircling the chuck adjacent the extremities of the keys for retaining the keys in the apertures.

In testimony whereof I have signed this specification.

CHARLES C. HANSEN.